United States Patent [19]

Martin et al.

[11] 4,279,449

[45] Jul. 21, 1981

[54] SLIDE SURFACE COMPOUND FOR TRACK-DRIVEN VEHICLE

[75] Inventors: Billy P. Martin; Vernon V. Vanis, both of Lincoln, Nebr.

[73] Assignee: The Goodyear Tire & Rubber Company, Akron, Ohio

[21] Appl. No.: 926,183

[22] Filed: Jul. 20, 1978

[51] Int. Cl.³ .......................... C08J 3/20; C08K 3/30; C08K 5/54
[52] U.S. Cl. .......................... 305/35 EB; 260/29.1 SB
[58] Field of Search .................. 260/29.1 SB; 526/29; 525/354; 305/35 EB

[56] References Cited

U.S. PATENT DOCUMENTS

| 3,781,067 | 12/1973 | Dodson et al. | 305/35 EB |
|---|---|---|---|
| 4,003,843 | 1/1977 | Kempermann et al. | 526/29 |
| 4,044,037 | 8/1977 | Mui et al. | 526/29 |

OTHER PUBLICATIONS

G. G. Smith, et al., Rubber Chemistry & Technology, vol. 49, pp. 140–149.

Primary Examiner—Joseph L. Schofer
Assistant Examiner—Peter F. Kulkosky
Attorney, Agent, or Firm—J. D. Wolfe; D. M. Ronyak

[57] ABSTRACT

A flexible endless belt track for a track-driven vehicle, said belt track having an outer ground-contacting surface to provide traction and an opposite inner surface which is adapted for moving contact with rigid elements of the vehicle drive means and the belt track supporting means, said inner surface including at least one surface portion of elastomeric material comprised of at least one vulcanized rubbery composition, said rubbery composition comprised of (A) from about 10 to about 35 parts of at least one polybutadiene polymer having a total 1,4 content of from about 80% to 100%, a cis 1,4 content of at least 10% and a combined cis 1,4 plus 1,2 content of at least 30% and (B) from about 65 to about 95 parts of two different rubbery polymer, said parts being by weight per 100 parts of (A) plus (B) and 10 to 35 parts of molybdenum disulfide and 3 to 7 parts of a mercaptosilicone or a mercaptosilane, said surface portion being adapted to come into direct moving contact with said rigid elements.

9 Claims, 2 Drawing Figures

SLIDE SURFACE COMPOUND FOR TRACK-DRIVEN VEHICLE

BACKGROUND OF THE INVENTION

This invention relates to a flexible endless belt track for a track-driven vehicle such as a snowmobile or the like and to a method of making such belt tracks. The invention more particularly relates to such a belt track having an improved service life. The invention even more particularly relates to rubber compositions for making belt tracks having improved flexible, low friction and wear resistant surfaces for use with vehicle slider suspension systems and with driving systems in which a driving sprocket comes into moving contact with driving means such as teeth or lugs formed on the inside surface of the belt track.

It has been quite common in the prior art to produce belt tracks for small track-driven vehicles such as snowmobiles in which the tracks are provided with one or two rows of spaced sprocket teeth receiving openings adapted to mesh with the vehicle drive sprockets. More recently, it has been popular to mold driving teeth or lugs on the inside surface of the belt track which operate in conjunction with specially designed sprockets to drive the vehicle with no sprocket teeth-receiving openings being necessary. An example of the latter type construction is disclosed in Irgens U.S. Pat. No. 3,472,563 and in Dodson et al's U.S. Pat. No. 3,781,067. Some tracks utilize a combination of the driving lugs and/or sprocket teeth-receiving openings as is illustrated in Russ, Sr. U.S. Pat. No. 3,575,474. Those skilled in the art are aware that in belt track constructions of the type discussed above, the direct sliding frictional contact between slider suspension and the inner surface of the track results in an excessive amount of wear often necessitating the early replacement of the track.

Illustrative of the problems which have been encountered with the use of the channel member or slider bar is its tendency to wear rapidly at the relatively low temperatures, for example, 150°–200° F. These temperatures are built up by frictional contact during the operation of the vehicle in which no snow or water is available for lubrication. Attempts to find other suitable low friction wear-resistant materials from which to produce the slider bars have not proven to be entirely satisfactory.

THE INVENTION

We have discovered that by suitably compounding the elastomer compositions used to make those belt track members and sliding frictional contact members, the service life of said members is greatly improved.

In accordance with the present invention, it has been found unexpectedly that the above problems are reduced in severity and these results can be accomplished by providing a flexible endless belt track for a track-driven vehicle wherein the belt track has an outer ground-contacting surface to provide traction and an opposite inner surface which is adapted for moving contact with rigid elements of the vehicle drive means and the belt track supporting means. The inner surface includes at least one surface portion of elastomeric material comprised of at least one vulcanized rubbery composition with the rubbery composition comprised of (A) from about 10 to about 35 parts of at least one polybutadiene polymer having a total 1,4 content of from about 80% to 100%, a cis 1,4 content of at least 10% and a combined cis 1,4 plus 1,2 content of at least 30%, and (B) from about 65 to about 90 parts of a blend of two different rubbery polymers with the parts being by weight per 100 parts of (A) plus (B) and 10 to 25 parts of molybdenum disulfide and 3 to 7 parts of a mercaptosilicone or a mercaptosilane. The surface portion is adapted to come into direct moving contact with the rigid elements of the vehicle drive means and the belt track supporting means.

The inner surface of the belt track may be generally planar and the surface portion may include at least substantially the entire inner surface of the belt track. In addition, the inner surface of the belt track may comprise a plurality of driving lugs formed as an integral part of the inner surface. The surface portion may also include both the driving lugs and at least substantially the entire inner surface of the belt track. Alternatively, the surface portion may also comprise at least one strip extending longitudinally of the inner surface of the belt track.

Preferably, the rubbery polymer is comprised of from about 10 to about 35 parts of a vulcanized rubbery polymer of the polybutadiene material as defined above and from about 65 to about 90 parts of a blend of two different rubbery polymers. Also, preferably, the cis 1,4 content of the polybutadiene is at least 30% and the combined cis 1,4 content and 1,2 content is at least 50%. Even more preferably, the cis 1,4 content is at least 85%.

The two different rubbery polymers may be at least a first rubbery polymer selected from the group consisting of a copolymer of butadiene and styrene, a copolymer of butadiene and acrylonitrile, an ethylene propylene terpolymer, and chlorobutyl rubber with a second rubbery polymer containing carboxylated groups. Preferably, the two different rubbery polymers comprise a first rubber polymer of a copolymer of butadiene and styrene or a copolymer of butadiene and acrylonitrile and the second rubbery polymer comprises a carboxylated polymer of butadiene and acrylonitrile.

In accordance with the present invention, it has also been found that the above objects and advantages are accomplished better by providing a method for making the belt track as described above utilizing a composition comprising (A) combining (1) from about 10 to about 35 parts of at least one polybutadiene polymer having a total 1,4 content of from about 80% to 100%, a cis 1,4 content of at least 10% and a combined cis 1,4 plus 1,2 content of at least 30% and (2) from about 65 to about 90 parts of two different rubbery polymers to provide a rubbery vulcanizable composition, said parts being by weight per 100 parts of (1) plus (2) and 10 to 25 parts of molybdenum disulfide and 3 to 10 parts of a mercaptosilicone or a mercaptosilane; (B) forming said rubber composition into at least one surface portion of the inner surface of an unvulcanized belt in usual manner as taught in U.S. Pat. No. 3,781,067; and (C) vulcanizing said endless belt to form a belt track for a track-driven vehicle.

It is to be understood that for the purposes of this invention, the term "vulcanize" is used in its broadest sense to include all means of cross-linking rubbery polymers both with and without the use of sulphur.

DESCRIPTION OF THE PREFERRED EMBODIMENTS

The belt track normally comprises a high quality natural or synthetic rubber reinforced in the longitudinal direction by textile fabric material either of a cord or woven construction. The textile fabric material, for example, can be cotton, nylon, rayon, polyester, metal, or glass fibers, with metal wire being the preferred reinforcing material.

Figure 1:
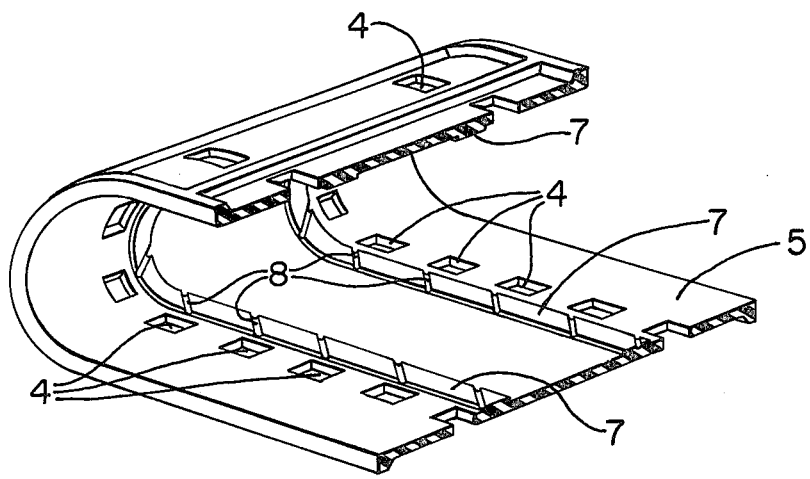
FIGS. 1 and 2 are fragmentary perspective views showing two different embodiments of the belt track in an uninstalled condition with the respective views showing embodiments with raised knobs and slit construction.
Figure 2:
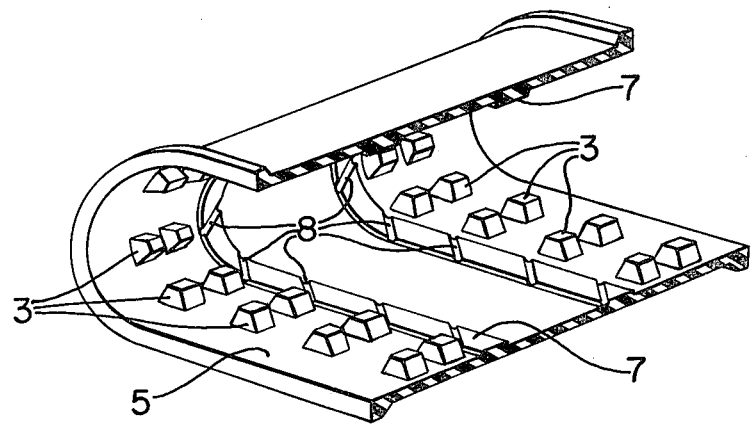

It should also be apparent to those skilled in the art that the belt track of the present invention can be of the type having at least one row of sprocket teeth-receiving openings extending completely through the belt as shown in FIG. 2 of the instant specification, or in the figures of U.S. Pat. No. 3,781,067, or of the type including a plurality of driving teeth or lugs formed on the inner surface without having sprocket teeth-receiving openings provided therein as shown in FIG. 1 of the instant specification and in FIGS. 5 and 6 of U.S. Pat. No. 3,781,067 or may be a combination of these two constructions having both sprocket teeth-receiving openings and driving lugs.

The surface portions are formed of at least one vulcanized rubbery composition comprised of at least one polybutadiene polymer and two different different rubbery polymers which are preferably a first rubbery polymer selected from the class of a copolymer of butadiene and styrene, a copolymer of butadiene and acrylonitrile, an ethylene propylene terpolymer, and chlorobutyl rubber, and the second rubbery polymer is a carboxylated polymer of butadiene and acrylonitrile.

In this composition, the polybutadiene polymer is preferably combined with a first rubbery polymer selected from a copolymer of butadiene and styrene or a copolymer of butadiene and acrylonitrile, and a second polymer of a carboxylated polymer of butadiene/acrylonitrile.

The polybutadiene polymer is present in an amount of from about 10 to about 35 parts and the two different rubbery polymers are present in an amount of from about 65 to about 95 parts with the parts being by weight per 100 parts of the total combined polymers. In the most preferred form of the invention, the polybutadiene polymer is present in an amount of from about 15 to about 25 parts and the two different rubbery polymers in an amount of from about 75 to about 85 parts based on 100 parts of the polybutadiene polymer plus the two different rubbery polymers.

The polybutadienes suitable for use in this invention are those which contain a total 1,4 content of from about 80% to 100%, a cis 1,4 content of at least 10% and a combined cis 1,4 plus 1,2 content of at least 30%. Preferably, the polybutadiene polymer has a cis 1,4 content of at least 30% and a cis 1,4 content plus 1,2 content of at least 50%. Most preferably, the polybutadiene polymer has a cis 1,4 content of at least 85%.

Representative of these polybutadienes are those which are characterized by having at least 85% of polybutadiene units in a cis and trans 1,4 structure of which about 20–50% are cis and not more than 15% in the 1,2-configuration. Such polymers are prepared by polymerizing butadiene in the presence of metallic lithium, hydrocarbon lithium compounds or other lithium based catalyst systems.

Other types of belt construction and polybutadienes suitable for use in this invention are those described or incorporated by reference in U.S. Pat. No. 3,781,067.

The copolymers of butadiene and styrene used in the practice of the present invention are the butadiene 1,3/styrene elastomers (SBR) well known in the art. These polymers normally possess a bound butadiene content of at least 40 weight percent and preferably at least 50 weight percent, most preferably 70 weight percent.

The copolymers of butadiene and acrylonitrile commonly referred to as nitrile rubber used in the practice of the present invention are a vulcanized rubbery copolymer of butadiene and acrylonitrile of the type disclosed in *Rubber Chemistry and Technology* "A Rubber Review for 1963 Nitrile Rubber" by W Hofmann, Volume 37, April-June 1964, Part 2. In the nitrile rubbers used in the present invention, preferably the acrylonitrile is present in an amount of at least 25% of the total copolymer with the amount of acrylonitrile and the copolymers of the present invention being normally from 25% to about 60%.

The ethylene propylene terpolymers which may be used in accordance with the present invention are terpolymers of ethylene, propylene and non-conjugated dienes (EPDM). Representative examples of these rubbery terpolymers are described in U.S. Pat. No. 3,331,793, column 2, lines 54–59.

Chlorobutyl rubber can be used as a first rubbery polymer instead of the copolymer of butadiene styrene.

The rubbery composition of the present invention can be prepared and compounded using any of the conventional compounding techniques as well as any of the known compounding ingredients such as carbon black, silica, zinc oxide, stearic acid and sulphur. Essential to obtaining the better compounding of the rubbery composition is the inclusion of 10 to 25 and preferably 15 to 20 parts of molybdenum disulfide and 3 to 10 parts and preferably 5 to 7 parts of the mercaptosilicone or mercaptosilane.

Also, in the above compositions, the preferred mercaptosilanes and mercaptosilicones contain the mercaptopropyl or mercaptoethyl groups and are in the fluid range about 20 to 3500 centipoises at 25° C. and preferably 60 to 1000 centipoises rather than in the solid range of molecular weights. Hence, the molecular weights can range from less than 1000 to values up to about 30,000 and higher with the thiol functionality (%-SH) being up to 15% or more with the preferred ranges being 0.5 to 3.5% SH. The mercapto groups can be attached to the silicon oxygen or silicon backbone either randomly along the silicon oxygen chain or to the silicon in the backbone to give terminal groups. Examples of suitable mercaptosilicones or mercaptosilanes are those silicones containing mercaptopropyl substituents and gamma mercaptotrimethoxysilane, available as A-189 from Union Carbide and Carbon Company or Dow-Corning ® X2-8024 Fluid, and related mercaptosilicone or mercaptosilane fluids available as materials available as fluids having 1 to 5% SH content, viscosities of 700 to 1000 or values. Other useful mercaptosilanes and mercaptosilicones are disclosed in article "Rubber Modification with Mercaptosilicones" by Peter G. Pope and H. Franklin Stewart presented at the Division of Rubber Chemistry meeting, The American Chemical Society, Cincinnati, Ohio, Oct. 3, 1972.

The method of making the flexible endless belt track of the present invention includes the steps of combining at least one polybutadiene rubber of the type described above with two different rubbery polymers such as a styrene/butadiene rubber and a nitrile rubber containing carboxyl groups in the preferred proportions together with 15 to 20 parts of molybdenum disulfide and 5 to 7 parts of a mercaptosilicone or a mercaptosilane, as discussed above to provide a rubbery vulcanizable composition. This can be accomplished by conventional mixing techniques using conventional rubber processing equipment such as a Banbury mixer or mixing mill. The rubbery vulcanizable composition is then formed into at least one surface portion of the inner surface of the unvulcanized belt. This may be accomplished also in a conventional manner by assembling the various components of the belt track on a building drum or mandrel with the surface portion or layer being disposed in the desired location on the inner surface of the track. The various belting components are then combined into an integral composite structure by means of conventional vulcanizing equipment. For instance, a circular mold having the desired outer or ground-contacting surface configuration in which an inside diaphragm exerts pressure to force the unvulcanized belt into the mold will produce an endless belt track. An autoclave arrangement may also be employed to achieve a satisfactory product. Alternately, the belt tracks may be cured in a flat press and made endless by conventional splicing techniques.

The driving teeth or lugs, if desired, may be formed on the inner surface of the belt track by using a mold having the desired contour. In most instances, not only the lugs themselves but the entire inner surface of the belt track will be formed from the rubbery composition as described previously or so excellently described in U.S. Pat. No. 3,781,067.

The belt tracks after vulcanization are of improved construction in that the surface portions of the inner surface of the track having a relatively low coefficient of friction, a relatively high abrasion resistance and are flexible under conditions of extremely high and low temperatures.

The following examples further illustrate the objects and advantages of this invention.

EXAMPLE I

Several sample belt tracks of the type shown in the drawing, i.e. FIGS. 1 and 2, were manufactured having inner surfaces 5 in which the entire inner layer included the surface portions 6 of the present invention, and as shown in FIG. 2 has glides 7 and grooves 8. Representative of these samples was a belt track in which the surface portion was comprised of a vulcanized rubbery composition of a polybutadiene rubber and a styrene/butadiene rubber having the following formulation identified as Composition A.

|  | Parts by Weight A |
|---|---|
| Polybutadiene (1) | 25.00 |
| Styrene/Butadiene Rubber (2) | 50.00 |
| Carboxylated Nitrile Rubber (3) | 25.00 |
| Non-Black Filler | — |
| Carbon Black, FEF | 60.00 |
| Stearic Acid | 3.00 |
| Mixed diaryl-p-phenylenediamine | 2.00 |
| Antiozonant | 3.00 |

-continued

|  | Parts by Weight A |
|---|---|
| Plasticizers (High aromatic staining processing oil) | 5.00 |
| Zinc Oxide | 3.00 |
| Vulcanizing Agents |  |
| Benzothiazyl disulfide | 1.00 |
| Tetramethylthiouram disulfide | 0.10 |
| Rubber Maker's Sulfur | 2.50 |
| Molybdenum disulfide | 15.00 |
| Mercaptosilicone (4) | 5.00 |

(1) Solution polymerized cis 1,4 polybutadiene polymer using a stereo specific catalyst and having a cis 1,4 content of at least 85%.
(2) A rubbery copolymer of butadiene and styrene (SBR-1500).
(3) A rubbery copolymer of butadiene and acrylonitrile containing carboxylation.
(4) Dow-Corning's X2-8024 Fluid containing 2.2% SH and 4.2% dimethyl SiO.

In Composition A the plasticizers used were aromatic processing oil and the carbon black used was of the high abrasion furnace type. The vulcanizing agents used were of the sulphur type. The styrene/butadiene rubber was added to the formulation as part of a rubber and oil masterbatch also including a high abrasion furnace black, an aromatic processing oil and an antioxidant stabilizer.

Other formulations similar to Composition A can be used where the polymers are those listed heretofore and which include various amounts of both carbon black and non-black fillers, such as silica. In addition, cure systems of the peroxide type may be used.

The above formulations are expressed in proportions on the basis of parts by weight based on the weight of the polybutadiene, styrene/butadiene rubber and butadiene acrylonitrile carboxylated rubber in Composition A.

The above compositions were prepared in the following manner. The polybutadiene polymer and the two different rubbery polymers of either styrene/butadiene or carboxylated nitrile rubber were added together with about 10 to 20 parts of the carbon black or non-black filler to a Banbury mixer and mixed to produce a non-productive stock. Then the vulcanizing agents were added to the non-productive stock in the Banbury during a second pass.

After the mixing procedure was complete and the stocks cured, samples were taken from the compositions and tested for friction and wear-resistance properties.

Additional friction tests were performed on the vulcanized belt tracks in order to simulate actual field conditions. One of these tests involved mounting the vulcanized belt tracks on a motor-driven apparatus having sprocket wheels and belt-supporting wheels and including an inverted slider suspension system with a one-inch wide steel slide. During the operation of the belt track the steel slide was in moving contact or engagement with the surface portions of the belt track. The temperature of the slide and the torque input from the motor were recorded during the tests. The vulcanized belts made using Composition A of the recipes set forth herein were rated far superior to those made using Composition A of U.S. Pat. No. 3,781,067, the best elastomer previously known. Also, the tracks with grooves or bosses are preferred as they reduce the moisture problem.

The styrene/butadiene rubber of the recipe of Composition A can be replaced with a copolymer of acrylonitrile, ethylene propylene terpolymer and chlorobutyl rubber to yield suitable rubber compositions.

It should be apparent to those skilled in the art that the present invention provides a belt track for a track-driven vehicle and a method of making such a belt track wherein the belt track has an improved flexible low friction and wear-resistant inner surface capable of withstanding direct sliding frictional contact with elements of the vehicle driving system and the track suspension system.

While certain representative embodiments and details have been shown for the purpose of illustrating the invention, it will be apparent to those skilled in the art that various changes and modifications may be made therein without departing from the spirit or scope of the invention.

What is claimed is:

1. A flexible endless belt track for a track-driven vehicle, said belt track having an outer ground-contacting surface to provide traction and an opposite inner surface which is adapted for moving contact with rigid elements of the vehicle drive means and the belt track supporting means, said inner surface including at least one surface portion of elastomeric material comprised of at least one vulcanized rubbery composition, said rubbery composition consisting of (A) from about 10 to about 35 parts of at least one polybutadiene polymer having a total 1,4 content of from about 80% to 100%, a cis 1,4 content of at least 10% and a combined cis 1,4 plus 1,2 content of at least 30% and (B) from about 65 to about 95 parts of two different rubbery polymers, said parts being by weight per 100 parts of (A) plus (B), and 10 to 35 parts of molybdenum disulfide and 3 to 7 parts of a mercaptosilicone or a mercaptosilane, said surface portion being adapted to come into direct moving contact with said rigid elements.

2. The belt track as claimed in claim 1, wherein said inner surface is generally planar and said surface portion includes at least substantially the entire inner surface of said belt track.

3. The belt track as claimed in claim 1, wherein said surface portion comprises a plurality of driving lugs formed as an integral part of said inner surface.

4. The belt track as claimed in claim 3, wherein said surface portion comprises both said driving lugs and at least substantially the entire inner surface of said belt track.

5. The belt track as claimed in claim 3, wherein said surface portion contains openings for so-called external drive sprockets and at least a substantial portion of the inner surface of said belt track which contacts the track slide surface has a groove or embossment to channel moisture to outside edges of the track.

6. A vulcanizable rubbery composition consisting of (A) from about 10 to about 35 parts of at least one polybutadiene polymer having a total 1,4 content of from about 80% to 100%, a cis 1,4 content of at least 10% and a combined cis 1,4 plus 1,2 content of at least 30% and (B) from about 65 to about 95 parts of two different rubbery polymers, said parts being by weight per 100 parts of (A) plus (B) and 10 to 25 parts of molybdenum disulfide and 3 to 7 parts of a mercaptosilicone or a mercaptosilane.

7. The belt track as claimed in claim 1, wherein said two different rubbery polymers are at least one rubbery polymer selected from the group consisting of a copolymer of butadiene and styrene, a copolymer of butadiene and acrylonitrile, an ethylene propylene terpolymer, and chlorobutyl rubber.

8. The belt as claimed in claim 7, wherein said different rubbery polymer is a copolymer of butadiene and styrene.

9. The belt track as claimed in claim 7, wherein said different rubbery polymer is a copolymer of butadiene and acrylonitrile.

* * * * *